US006372178B1

(12) United States Patent
Tseng

(10) Patent No.: US 6,372,178 B1
(45) Date of Patent: Apr. 16, 2002

(54) METHOD FOR FREEFORM FABRICATION OF A THREE-DIMENSIONAL OBJECT

(75) Inventor: Ampere A. Tseng, Phoenix, AZ (US)

(73) Assignee: Arizona Board of Regents Acting for and on behalf of Arizona State University, Tempe, AZ (US)

( * ) Notice: Subject to any disclaimer, the term of this patent is extended or adjusted under 35 U.S.C. 154(b) by 0 days.

(21) Appl. No.: 09/416,684

(22) Filed: Oct. 12, 1999

Related U.S. Application Data

(62) Division of application No. 09/020,764, filed on Feb. 9, 1998, now Pat. No. 6,030,199.

(51) Int. Cl.$^7$ ............................................. C04B 33/32
(52) U.S. Cl. ..................... 264/656; 264/241; 264/250; 264/294; 264/308
(58) Field of Search ................. 264/241, 250, 264/294, 308, 167, 656

(56) References Cited

U.S. PATENT DOCUMENTS

| 1,918,127 A | 7/1933 | Pfeiffer |
| 2,859,475 A | 11/1958 | Tornberg |
| 3,072,962 A | 1/1963 | McDermott et al. |
| 3,914,085 A | 10/1975 | Kruelskie |
| 4,749,347 A | 6/1988 | Valavaara |
| 4,929,402 A | 5/1990 | Hull ............................. 264/22 |
| 5,076,869 A | 12/1991 | Bourell et al. ............. 156/62.2 |
| 5,207,371 A | 5/1993 | Prinz et al. .................. 228/159 |
| 5,216,616 A | 6/1993 | Masters |
| 5,226,948 A | 7/1993 | Orme et al. .................. 75/331 |
| 5,257,657 A | 11/1993 | Gore |
| 5,529,471 A | 6/1996 | Khoshevis |
| 5,647,931 A | 7/1997 | Retallick et al. |
| 5,738,817 A * | 4/1998 | Danforth et al. ............ 264/603 |
| 5,764,521 A | 6/1998 | Batchelder et al. |

FOREIGN PATENT DOCUMENTS

| JP | 61-270134 | 11/1986 |
| JP | 5-000076 | 1/1993 |

OTHER PUBLICATIONS

"Solid Freeform Fabrication: A New Direction in Manufacturing" by J.J. Beaman, J.W. Barlow, D.L. Bourell, R.H. Crawford, H.L. Marcus and K.P. McAlea, ch. 1 (Clair Academic, Boston, MA 1997).

(List continued on next page.)

Primary Examiner—Christopher A. Fiorilla
(74) Attorney, Agent, or Firm—Baker Botts L.L.P.

(57) ABSTRACT

An improved apparatus and method for forming a three-dimensional object by planar deposition of forming materials includes containers for holding molten forming materials, mechanical piston or screw members in the containers for pressurizing the molten forming materials in each of the containers, and an adjustable planar nozzle mechanism coupled to the containers through which the pressurized molten forming materials flow to form variable width planar jets that are deposited in layers onto a substrate movable along three axes to form the three-dimensional object. The adjustable planar nozzle mechanism includes cooperating position controllable plates for forming a variable width planar nozzle opening. The edges of the planar nozzle opening are advantageously non-parallel at the ends of the nozzle opening to ensure uniform thickness of the deposited planar jets.

11 Claims, 13 Drawing Sheets

OTHER PUBLICATIONS

"Three Dimensional Printing: Rapid Tooling and Prototypes Directly from a CAD Model" by E. Sachs, M. Cima, P. Williams, P. Brancazio and J. Cornie, ASME J. Eng. Induct., vol. 114, pp. 481–488 (1992).

"Laser Deposition of Metals for Shape Deposition Manufacturing" by J.R. Fessler, R. Merz, A.H. Nickel and F.B. Prinz, Solid Freeform Fabrication Proceedings, pp. 112–120 (University of Texas, Austin 1996).

"Predicting and Controlling Resolution and Surface Finish of Ceramic Objects Produced by Stereodeposition Processes" by R.S. Crockett, J. O'Kelly, P.D. Calvert, B.D. Fabes, K. Stuffle, P. Creegan and R. Hoffman, Solid Freeform Fabrication Proceedings, pp. 17–24 (University of Texas, Austin 1995).

"Rapid Prototyping & Manufacturing Fundamental of Stereolithography" by P.F. Jacobs, pp. 406–411 (Society of Manufacturing Engineering, Dearborn, MI 1992).

* cited by examiner

METHOD FOR FREEFORM FABRICATION OF A THREE-DIMENSIONAL OBJECT

This application is a divisional of United States Patent Application entitled "Apparatus and Method for Freeform Fabrication of a Three-Dimensional Object," Ser. No. 09/020,764, filed on Feb. 9, 1998 now U.S. Pat. No. 6,030,199.

TECHNICAL FIELD OF THE INVENTION

The present invention relates in general to an apparatus and method for manufacturing a three-dimensional object. More particularly, the apparatus and method is related to freeform fabrication techniques utilizing a planar deposition system having an adjustable planar nozzle. The apparatus and method of the present invention are especially useful in the fields of rapid prototyping and rapid fabrication.

BACKGROUND OF THE INVENTION

Freeform fabrication techniques are particularly useful for reducing the design, production and maintenance cycle times associated with the manufacture of three-dimensional objects. In the design phase, freeform fabrication techniques are especially useful for prototyping design concepts, investigating inconsistencies in the design and modifying the design prior to full-scale production. In addition, freeform fabrication techniques have been shown to produce higher quality products at lower cost.

However, the need presently exists for improved freeform fabrication techniques capable of producing complex structures at low cost with minimum set-up and run-time. Many recent techniques, especially in the area of complex metal or ceramic tools, have been-developed but remain mostly inadequate. See e.g. J. J. Beaman, N. W. Barlow, D. L. Bourell, R. H. Crawford, H. L. Marcus and K. P. McAlea, *"Solid Freeform Fabrication: A New Direction in Manufacturing,"* ch. 1 (Clair Academic, Boston, Mass. 1997).

The most widely known conventional freeform fabrication system is selective laser sintering ("SLS") as described by D. L. Bourell, H. L. Marcus, N. W. Barlow, J. J. Beaman and C. R. Deckard in U.S. Pat. No. 5,076,869 entitled "Multiple Material Systemsfor Selective Beam Sintering," which issued in 1991. This method employs a heat laser to fuse or "sinter" selected areas of powdered material such as metal or ceramics. In practice, a vat of powder is scanned by the laser, thereby melting individual particles that in turn stick to adjacent particles. The sintered layer, which is attached to a platform, is lowered into the vat, and new layers are deposited and sintered on top of the previous layers until the entire three-dimensional object or part is produced. An advantage of the sintering method is that the non-heated powder serves as a support for the part as it is formed. Consequently, the non-heated powder can be shaken, dusted or otherwise removed from the resulting object.

Conventional selective laser sintering systems, however, require the use of complex and expensive optical systems where the resolution and level of detail of the final product is limited by the diameter of the laser beam, which is typically 0.25 to 0.50 mm. Furthermore, in an additional step, the powder is deposited and leveled by a rolling brush which requires other electro-mechanical components. Unfortunately, leveling fine powders with a rolling brush often causes nonhomogeneous packing density. Consequently, an object built from the powder has medium resolution, a non-uniform surface, and often a non-homogeneous structure.

Another conventional method for freeform fabrication involves the use of a three-dimensional ("3-D") printing process to form "green preforms" for powdered ceramic and metal applications. See E. Sachs, M. Cima, P. Williams, P. Brancazio and J. Cornie, "Three-dimensional Printing: Rapid Tooling and Prototypes Directly from a CAD Model," ASME J. Eng. Induct., vol. 114, pp. 481–488 (1992). With this method, a silica binder is printed on selected areas of the powder to form a solid cross-section. The process is repeated to form a tack of cross-sections representing the final object. This approach exhibits the same powder deposition problems as selective laser sintering, along with the additional difficulty of removing unbound powder from internal cavities. Furthermore, objects generated by this system are not recyclable.

In addition, conventional 3-D printing, processes are further limited by an inability to automatically remove the media support for over-hangs, large spans, or disjoint areas, and an inability to provide an automated system for physically reproducing three-dimensional computer designs and images. Systems currently available are expensive—the material they use cannot be recycled, and they cannot provide for automated part handling after fabrication due to their use of bulk powders and resins, which require containers rather than conveyor platforms. Accordingly, improvements which overcome any or all of these problems are presently desirable.

Moreover, in addition to the two techniques (SLS and 3-D printing) discussed above, other conventional freeform fabrication schemes include stereo-lithography, shape deposition modeling ("SDM"), fused deposition modeling ("FDM"), and ballistic particle manufacturing ("BPM"). C. W. Hull, U.S. Pat. No. 4,929,402, entitled "Method for Production of Three-Dimensional Objects by Stereolithography" (1991); F. B. Prinz and L. E. Weiss, U.S. Pat. No. 5,207,371, entitled "Method and Apparatus for Fabrication of Three-Dimensional Metal Articles by Weld Deposition," (1993); J. R. Fessler et al., "Laser Deposition of Metals for Shape Deposition Manufacturing," Solid Freeform Fabrication Proceedings, pp. 112–120 (University of Texas, Austin 1996); R. S. Crockett, O. J. Kelly, P. D. Calvet, B. D. Fabes, K. Stuffle, P. Creegan and R. Hoffman, "Predicting and Controlling Resolution and Surface Finish of Ceramic Objects Produced by Stereo deposition Processes, " Solid Freeform Fabrication Proceedings, pp. 17–24 (University of Texas, Austin 1995); M. E. Orme and E. P. Muntz, U.S. Pat. No. 5,226,948, entitled "Method and Apparatus for Droplet Stream Manufacturing" (1993). These techniques are based on a raster scanning procedure, which is also know as "point-to-point" fabrication. P. F. Jacobs, "Rapid Prototyping and Manufacturing Fundamental of Stereolithography," pp. 406–411 (Society of Manufacturing Engineering, Dearborn, Mich. 1992) These systems build a single point at a time and consequently only one line or column per scan.

Therefore, a principle object of the present invention is to provide an apparatus and method for manufacturing high quality three-dimensional objects at low cost with minimum setup and run-times.

Another object of the present invention is to provide an apparatus for manufacturing a three-dimensional object utilizing an adjustable planar nozzle for forming a planar jet with uniform thickness.

A further object of the present invention is to provide a high-speed method for manufacturing a three-dimensional object utilizing an adjustable planar nozzle for depositing variable width layers of forming materials.

Yet another object of the present invention is to provide a high-speed method for manufacturing a three-dimensional object utilizing a minimal number of deposition scans per layer of deposited forming materials.

Still another object of the present invention is to provide an apparatus and method for manufacturing a three-dimensional object utilizing a position controllable platform.

Further objects, features and advantages of the invention will become apparent from the following detailed description taken in conjunction with the accompanying figures showing illustrative embodiments of the invention.

SUMMARY OF THE INVENTION

The present invention relates to an apparatus and method for forming a three-dimensional object which employ planar deposition of molten forming materials on a substrate. In accordance with a preferred embodiment of the present invention the apparatus includes containers for holding the molten forming materials, mechanical members within the containers for pressurizing the molten forming materials through each of the containers, an adjustable planar nozzle mechanism coupled to the containers through which the pressurized molten forming materials flow to form variable size planar jets that are deposited in layers onto the substrate to form the three-dimensional object. Preferably, the adjustable planar nozzle mechanism includes cooperating position controllable plates for forming a variable size planar nozzle opening.

The preferred method of the present invention includes the steps of loading a reservoir of forming materials in one or more containers, heating the forming materials to melt the forming materials in the containers and ejecting the molten forming materials from the containers and through one or more adjustable planar nozzles. In conjunction with the ejecting step, the preferred method further includes the steps of adjusting the size of the adjustable planar nozzles to form variable size planar jets of molten forming materials flowing towards the substrate, positioning the substrate beneath the planar jets, and depositing the forming materials in layers on the substrate to form the three-dimensional object.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
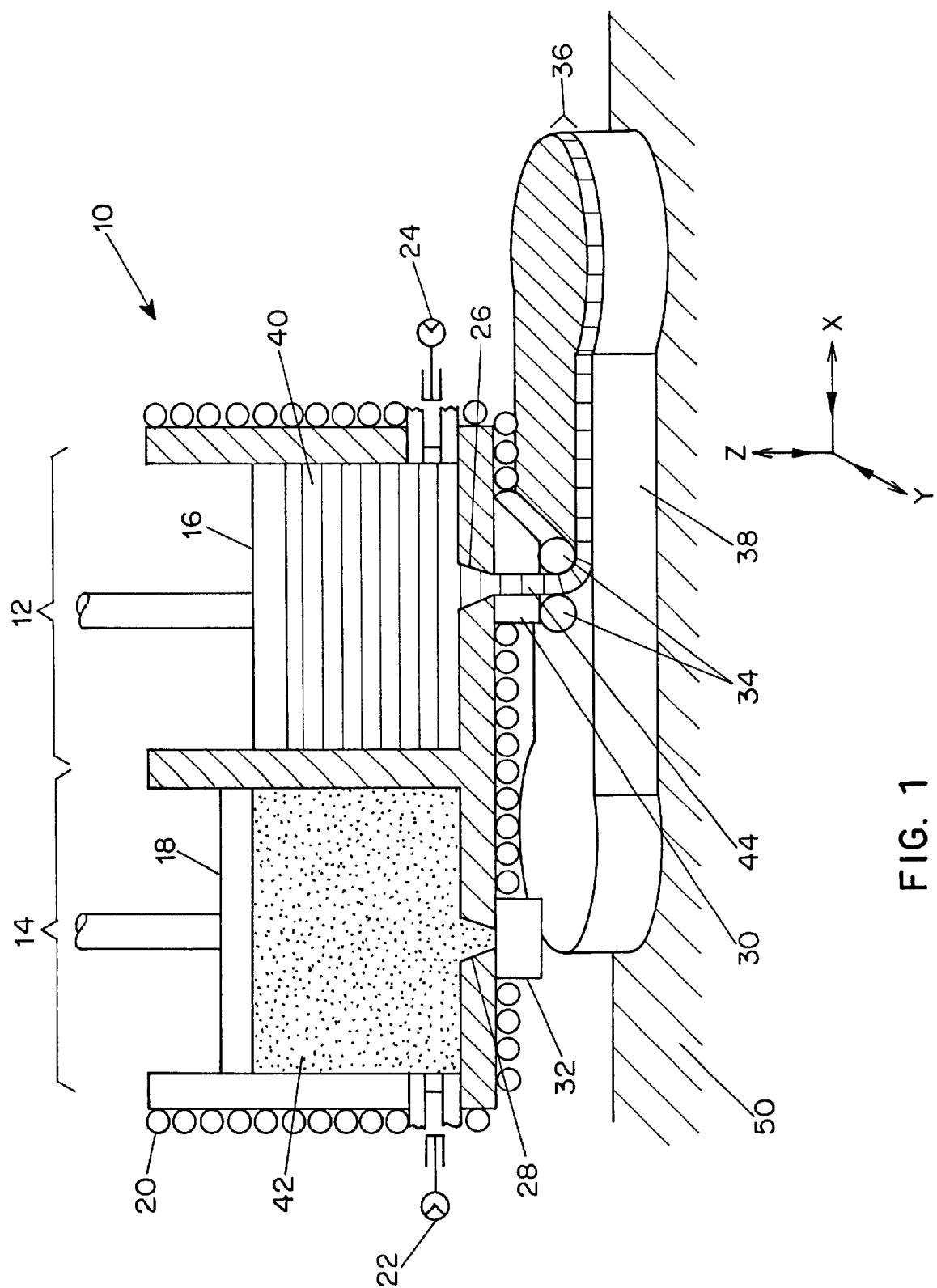
FIG. 1 is a sectional view of a preferred embodiment of an apparatus for forming a three-dimensional object.

FIG. 1 illustrates an apparatus 10 for forming a three-dimensional object according to a preferred embodiment of the present invention. As shown in FIG. 1, the apparatus deposits forming materials, shown as building and supporting materials 40 and 42, respectively, onto a position controllable substrate 50 for forming a three-dimensional object, or "workpiece," 38 disposed thereupon. The building material 40 is used to form the actual structure of the workpiece 38, while the supporting material 42 is used to support the workpiece structure during the deposition process. Preferably, the building material 40 is a high-melting-temperature metal or ceramic material, and the supporting material 42 is a low-melting-temperature material such as wax or oligomeric hydrocarbon materials that are easily removed after completion of the deposition process.

The apparatus 10 of FIG. 1 includes two cylindrically-shaped containers 12 and 14 for holding the building material 40 and supporting material 42, respectively. Although the present embodiment shows two containers, the apparatus 10 may include as many containers as required by the number of different materials used to form the workpiece 38. The containers 12 and 14 are made of high temperature alloys or ceramics, depending upon the application, which can be heated by a resistance or induction heating device 20. Containers made of stainless steel, for example, can be heated up to 1000° C. and thus are ideal for melting and holding aluminum-based alloys. For higher temperature applications, pure ceramic or ceramic matrix composite containers are recommended. Containers 12 and 14 may be housed in an environment-controlled deposition chamber (not shown) that provides a pressure regulated non-reactive gas, preferably nitrogen or helium, to prevent oxidation of the forming materials.

The containers 12 and 14 further include one-way inlet valves 22 and 24 for regulating the flow of the forming materials into the containers, container outlet orifices 26 and 28 disposed onto the bottom of the containers, and pistons 16 and 18 for forcing the corresponding material through the corresponding container orifice. Pistons 16 and 18 are displaced in a downward direction by a piston displacement controller (not shown) so as to apply pressure to the surface of the molten forming materials. The pressure exerted by the pistons 16 and 18 force the forming materials to flow through the container orifices 26 and 28, and through corresponding adjustable planar nozzles 30 and 32 coupled to each of the container orifices 26 and 28.

In response to the applied pressure, the molten forming materials flow through their respective adjustable planar nozzles 30 and 32 to form continuous variable size planar jets, or "sheets" 44 (only one shown), which are deposited on the position controllable substrate to form the layers 36 of the workpiece 38, the substrate being movable along three axes as indicated in the drawings. Although the continuous planar jets 44 of FIG. 1 are characterized by a varying width and a uniform thickness, it is possible to vary both dimensions of the continuous planar jets 44. The pressure at which the molten forming materials are ejected from the container orifices and through the adjustable planar nozzles 30 and 32 can be regulated via the pistons 16 and 18 so as to vary the speed of the continuous planar jets 44 and thus the deposition rate of the apparatus 10. The ejection pressure of the molten forming materials must not, however, be so great as to impair the uniformity of the continuous planar jets 44 formed at the adjustable planar nozzles. Rollers 34 are used for pressing, cooling and leveling of the deposited layer. Although only one pair of is shown, many pairs may be used as required between the continuous planar jets 44.

Figure 2:
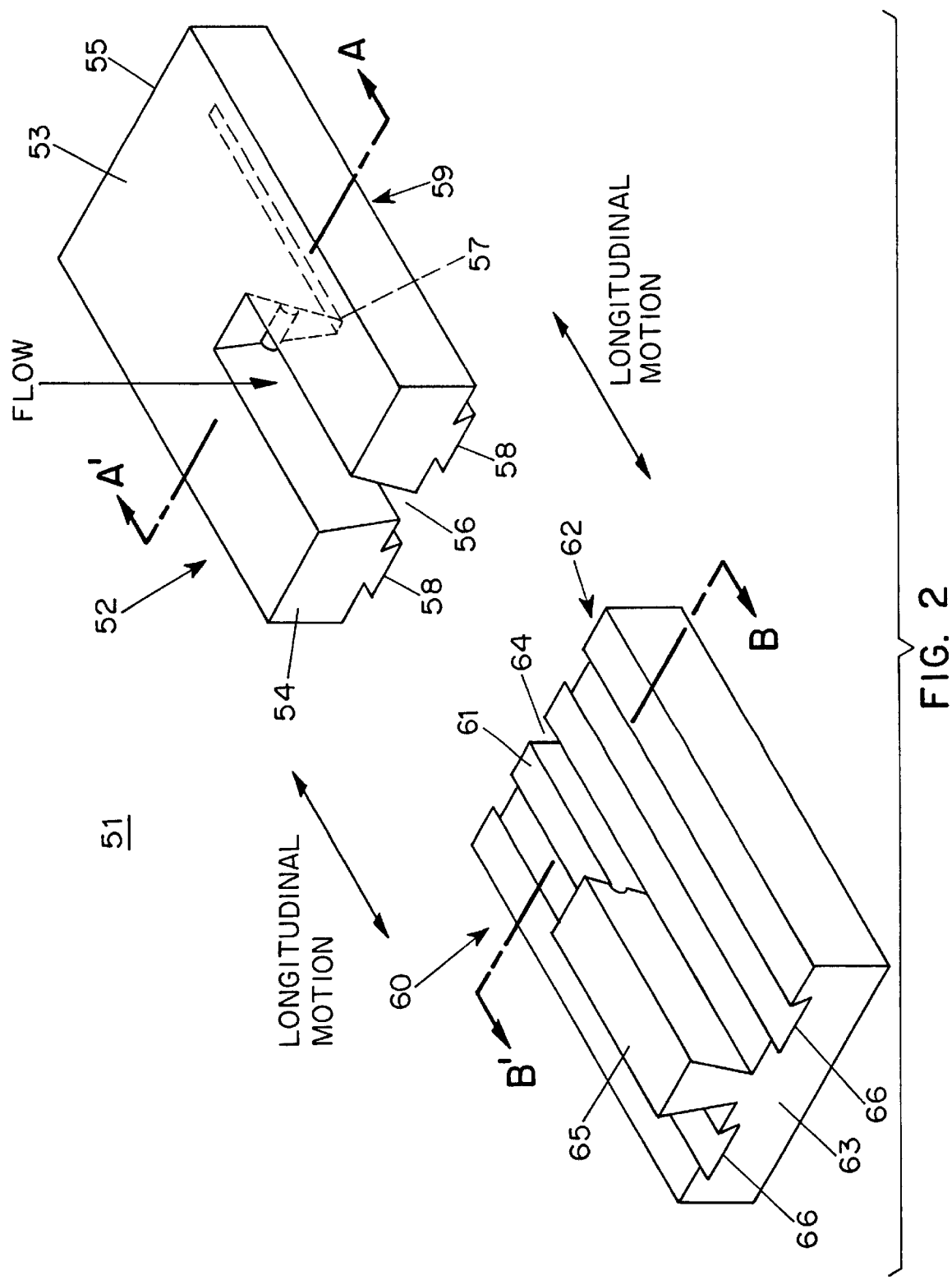
FIG. 2 is a three-dimensional view of an adjustable planar nozzle according to a preferred embodiment of the present invention.

FIG. 2 is a perspective view of an adjustable planar nozzle 51. The adjustable planar nozzle 51, which corresponds to the adjustable planar nozzles 30 and 32 of FIG. 1, is shown in unassembled configuration. The adjustable planar nozzle 51, when assembled, allows for efficient, high-speed planar deposition of forming materials using a minimal number of deposition "scans" or "passes."

Figure 3A:
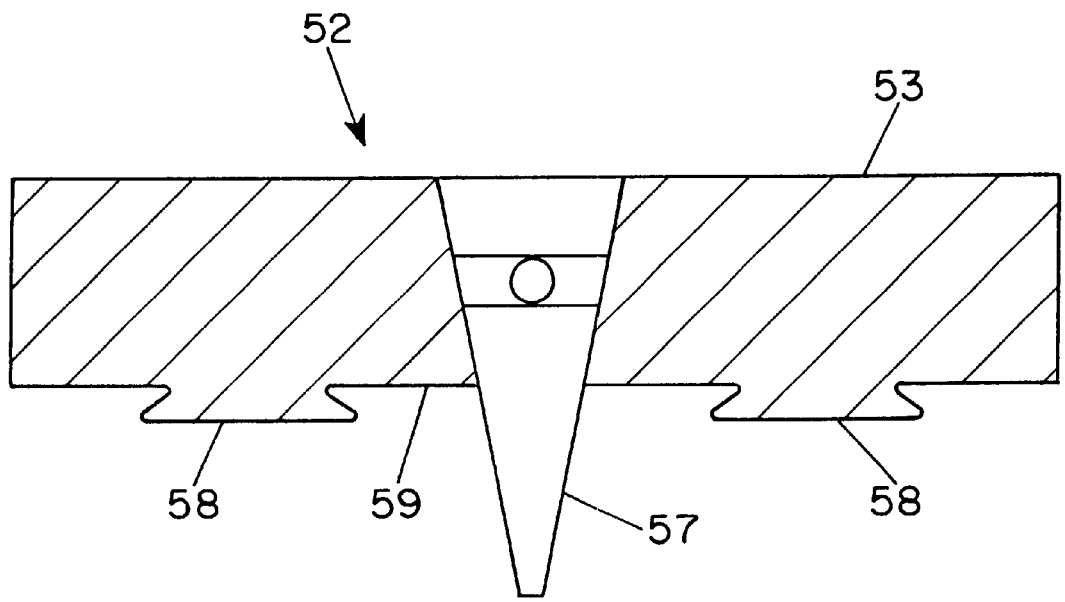
FIGS. 3a and 3b are cross-sectional views AA' and BB' of the top and bottom plates of the adjustable planar nozzle as shown in FIG. 2.

The adjustable planar nozzle 51 of FIG. 2 includes two cooperating position controllable plates, top and bottom plates 52 and 60, respectively, which are movable with respect to each other in a longitudinal direction. The top plate 52, which is preferably but not necessarily stationary with respect to the bottom plate 60, includes a substantially flat top surface 53, a bottom surface 59 with longitudinal groove mating ribs 58, an inner end 54 normal to the longitudinal direction, and an outer end 55 normal to the longitudinal direction opposite the inner side 54. The top plate 52 further includes an upper nozzle slit 56 extending longitudinally through the top plate 52 from the inner end 54 towards the center of top plate 52, and a "hanging" stop portion 57 disposed on the bottom surface 59 extending longitudinally from the upper nozzle slit 56 near the center of the top plate 52 to the end side 55 of the top plate 52. FIG. 3a is a cross-sectional view AA' of the top plate 52 again showing the top surface 53, bottom surface 59, hanging stop 57 and groove mating structures 58 of top plate 52. Preferably, the top plate 52 is fixed to a container, e.g., containers 12 and 14 of FIG. 1, with the substantially flat top surface 53 facing the flow of molten forming material from above.

Figure 3B:
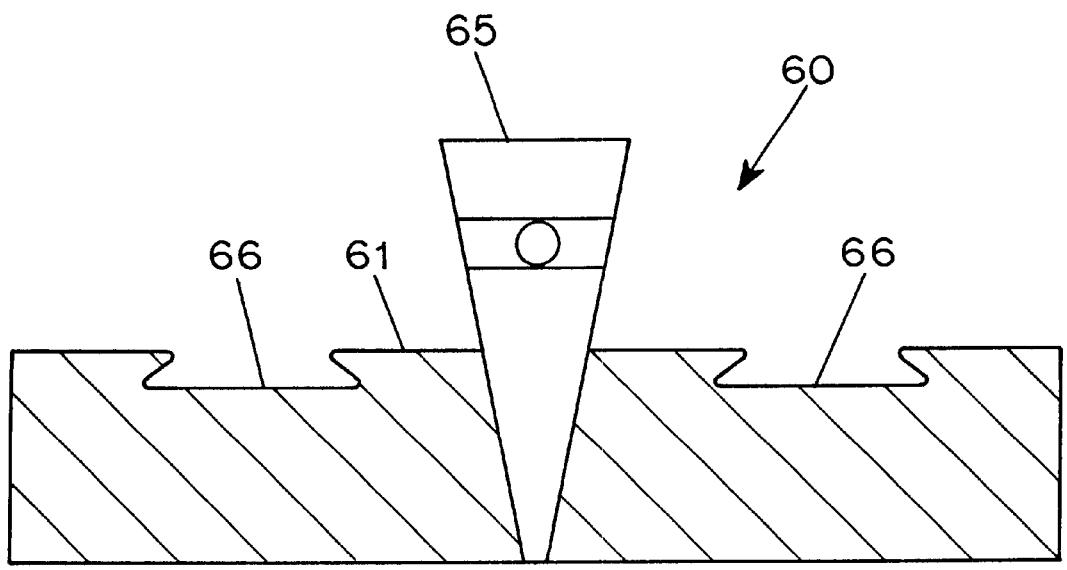

The bottom plate 60, which is preferably movable and not fixed with respect to the top plate 52, is designed to slide back and forth beneath the top plate 52 and includes a top surface 61 with longitudinal grooves 615 disposed therein that cooperate with the groove mating ribs 58 disposed on the bottom surface 58 of the top plate 52. The bottom plate 60 further includes an inner end 62 normal to the longitudinal direction and facing the inner side 54 of the top plate 52, an outer end 63 opposite the inner side 62, a lower nozzle slit 64 extending longitudinally through the bottom plate 60 from the inner end 62 of the bottom plate 60 towards the center of the bottom plate 62, and a raised stop 65 disposed on the top surface 61 of the bottom plate 62 and extending longitudinally from the lower nozzle slit 64 near the center of the bottom plate 62 to the outer end 63 of the bottom plate 60. As such, the upper and lower nozzle slits 56 and 64, in conjunction with said hanging and raised stop portions 57 and 65, are aligned with each other to form a variable width planar nozzle opening as the top and bottom plates are moved with respect to each other along a longitudinal direction. FIG. 3b is a cross-sectional view BB' of the bottom plate 60 again showing the top surface 61, the raised stop 65 and grooves 66 of bottom plate 60.

Figure 4A:
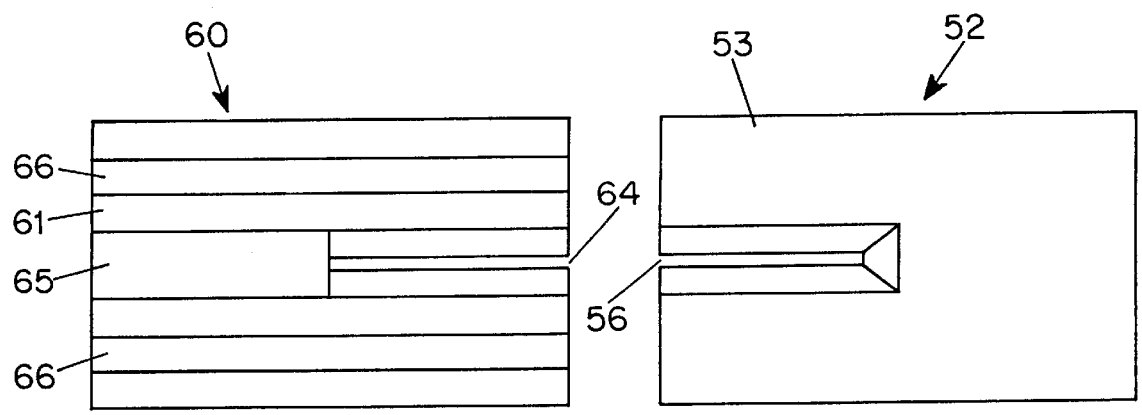
FIGS. 4a through 4c are top views of an adjustable planar nozzle in unassembled, fully opened and fully closed configurations, respectively, according to a preferred embodiment of the present invention.
Figure 4B:
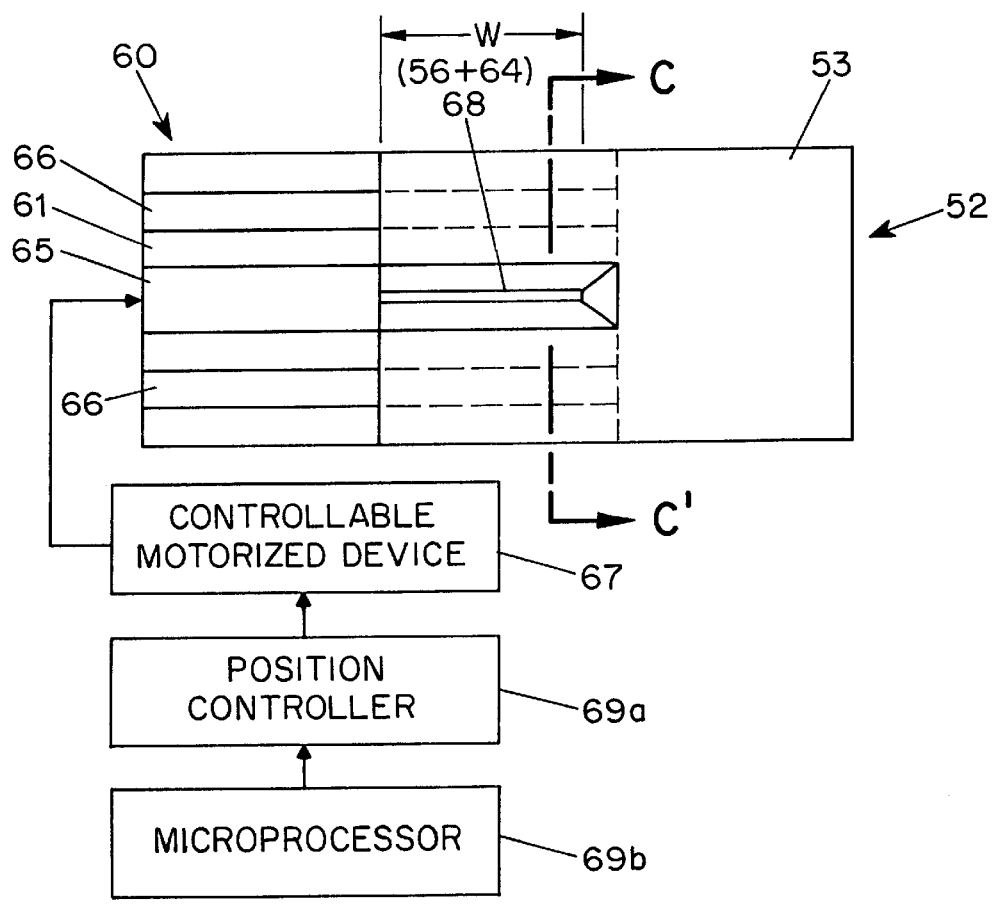
Figure 4C:
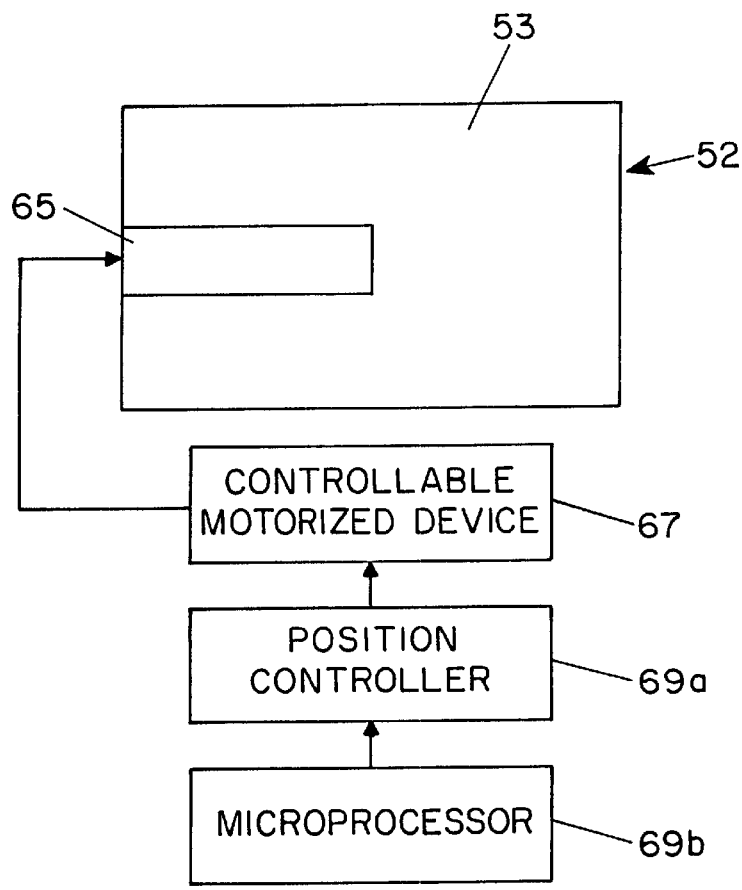

FIGS. 4a through 4c are top views of the adjustable planar nozzle 51 of FIG. 2. FIG. 4a shows the top and bottom plates 52 and 60, respectively, in an unassembled state. In an assembled state, as shown by FIGS. 4b and 4c, the top and bottom plates 52 and 60 are assembled with the upper and lower nozzle slits 56 and 64 facing each other to form a variable width planar nozzle 68. By way of example and not limitation, the bottom plate 60 is slid from side-to-side in a longitudinal direction underneath the top plate 52 by means of a controllable motorized device 67 coupled to the bottom plate 60, as indicated schematically in FIGS. 4b and 4c. Preferably, the controllable motorized device 67 receives positioning signals from position controller 69a, which generates the positioning signals based on instructions provided by a programmable microprocessor 69b. Preferably, the programmable microprocessor 69b is capable of executing a variety of computer aided design ("CAD") programs or other "slicing" algorithms for generating the positioning instructions provided to the position controller 69a. Accordingly, the width W of the variable width planar nozzle opening 68 can be varied, as required, from a fully open position as shown in FIG. 4b (maximum width) to a completely closed position as shown in FIG. 4c.

The controllable motorized device 67 for varying the width W variable width planar nozzle opening 68 includes a high precision motor capable of positioning the bottom plate 60 within an accuracy of one micrometer resolution. The maximum traveling distance of the bottom plate 60 can range from a few centimeters to as much as one hundred centimeters depending upon the size of the three-dimensional object to be built. Nominally, the travel speed for the bottom plate 60 can be as high as hundreds of millimeters per second.

Preferably, the top and bottom nozzle plates 52 and 60 are constructed using an abrasive material with a melting temperature substantially higher than that of the molten forming material to be deposited. Ideally, a plate material is chosen which is not wetted by the molten material. Preferred materials include ceramics, such as fused silica, ruby, sapphire, carbides and nitrides.

Figure 5:
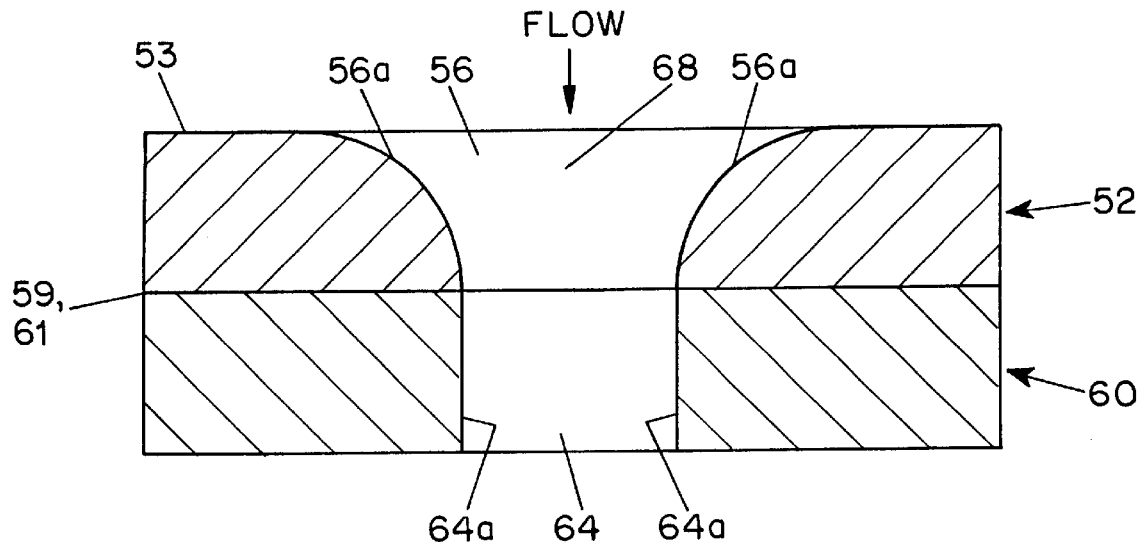
FIG. 5 is a cross-sectional view CC' of an alternative planar nozzle profile according to an open configuration as shown in FIG. 4b.

Although in FIGS. 2 through 4c, the nozzle slot edges are shown to be flat, sloping surfaces, they may have the modified cross-sectional profile CC' as shown in FIG. 5. Accordingly, as further shown in FIG. 5, the top plate 52 is constructed and arranged such that the upper nozzle slit edges 56a of the upper nozzle slit 56 gradually taper from the top surface 53 of the top plate 52 to the bottom surface 59 of the top plate 52. The tapered nozzle slit edges 56a serve to funnel the forming materials flowing in a downwards direction into the lower nozzle slit 64, which is characterized by substantially parallel nozzle slit edges 64*a*. As such the tapered nozzle slit edges 56*a* serve to produce a uniform flow rate for the forming materials as they exit the lower nozzle slit portion 64 of the variable width planar nozzle opening 68.

Figure 6:
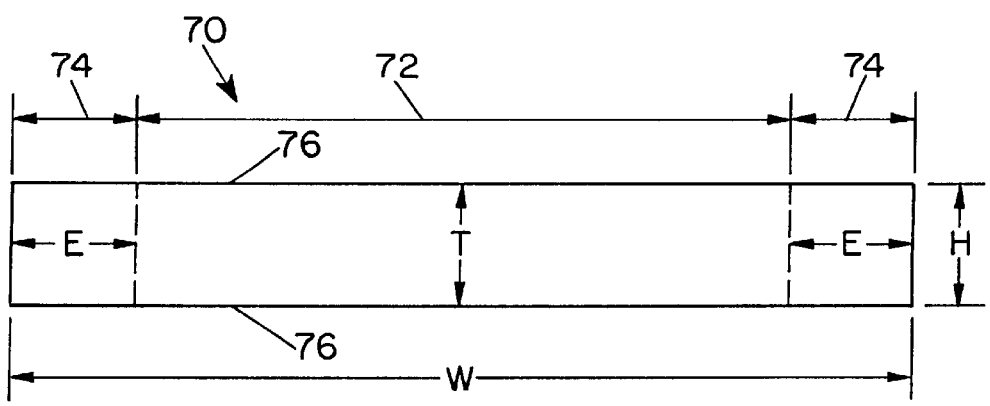
FIG. 6 is a top view of a rectangular variable width planar nozzle opening.

FIG. 6 shows in detail the dimensions of the planar nozzle opening 68, in a fully opened position, formed by the top and bottom nozzle plates of FIG. 2. As such, the planar nozzle opening 70 is substantially rectangular as shown in FIG. 6, having a central region 72, end regions 74, and characterized by an assembled nozzle thickness T and an assembled nozzle width W.

Although the slot thickness of the rectangular planar nozzle 70 is substantially uniform, the rectangular planar nozzle 70 of FIG. 6 may not always yield a uniform planar sheet, especially at the end regions 74. This is because the flow of molten material is constrained by three boundary edges in the end regions 74, but by only two boundary edges in the central region 72. Consequently, the flow of the material through the rectangular planar nozzle 70 is more constrained at the end regions 74 and thus has less flow mass, or lower velocity, than does the flow of material in the central region 72. When a rectangular planar nozzle slot such as the one shown in FIG. 6 is employed, the amount of molten material available at the end regions 74 is perhaps less than that at the center, possibly resulting in a non-uniform mass distribution and the formation of non-uniform planar sheets. Therefore, in order to ensure the uniform mass distribution of the planar sheets, the present invention further utilizes non-parallel end portions of the nozzle opening to ensure a uniform thickness for the planar jets to be formed by the adjustable planar nozzle.

Figure 7:
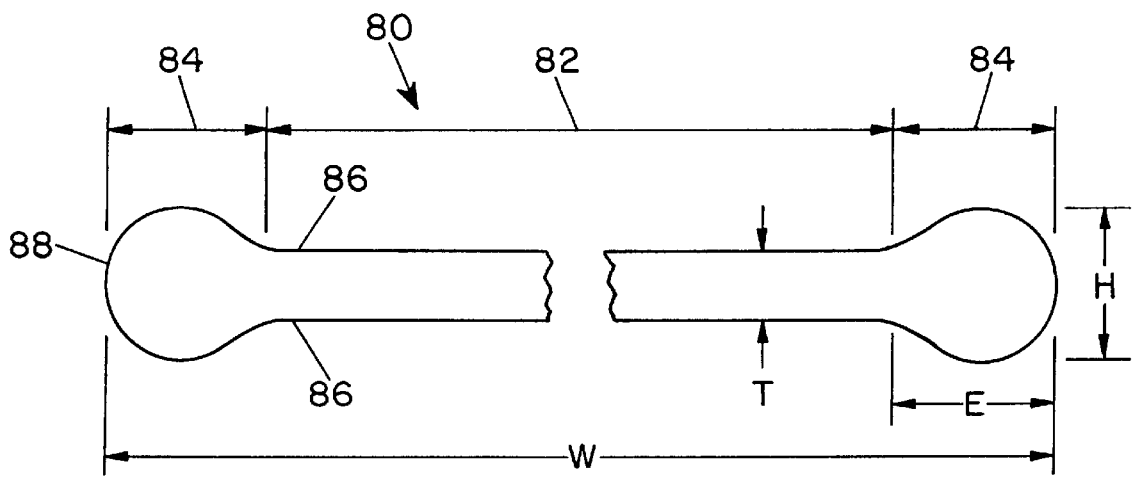
FIG. 7 is a top view of a variable width planar nozzle opening having round end regions.

FIG. 7 is a top view of a planar nozzle opening 80 with a central region 82 and round end sections 84. As compared with the rectangular end regions 74, as shown in FIG. 6, the round end regions 84 of FIG. 7 provide additional liquid flow at the end regions 84 of the planar nozzle opening 80. The round end regions 84 thus compensate for the flow lost in the edge regions as previously discussed. As such, the rounded end sections 84 cause a smoother-edged filament sheet to be deposited on the substrate.

As further shown in FIG. 7, the planar nozzle opening 80 includes two uniformly spaced opposing nozzle edges 86 which are parallel to each other along the central region 82. The space between the opposing nozzle edges 86 is denoted as thickness, or "gauge," T. By contrast, the end regions 84 of the planar nozzle opening 80 do not maintain a substantially uniform spacing. Rather, the planar nozzle opening 80 of FIG. 7 has curved nozzle edges 88 which cause the planar nozzle opening 80 to resemble a "dog bone" or "dumbbell" configuration. Thus, the planar nozzle opening 80 with the two round end regions 84 ensures nearly uniform mass flow, or velocity, through the planar nozzle opening 80 and hence uniform thickness in the emitted planar jet. The curved edges may be formed by cutting, carving or other conventional machining processes.

Figure 8:
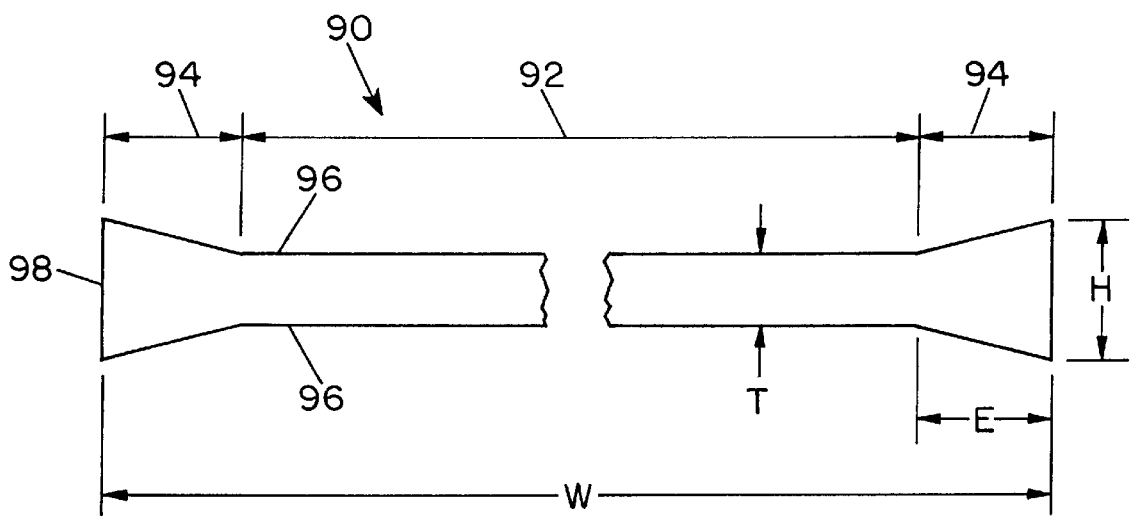
FIG. 8 is a top view of a variable width planar nozzle opening having linearly diverging end regions.

FIG. 8 is a top view of a planar nozzle opening 90 with a central region 92 and linearly diverging end regions 94. As shown in FIG. 8, the planar nozzle opening 90 includes two uniformly spaced opposing nozzle edges 96 which are parallel to each other along the central region 92. At the end regions 94, the opposing nozzle edges 96 diverge to form a planar nozzle opening 90 that resembles a rectangle with two sideways trapezoids attached on either end. The planar nozzle opening 90 with the linearly diverging end regions 94 thus ensures nearly uniform mass flow through the planar nozzle opening 90.

Figure 9:
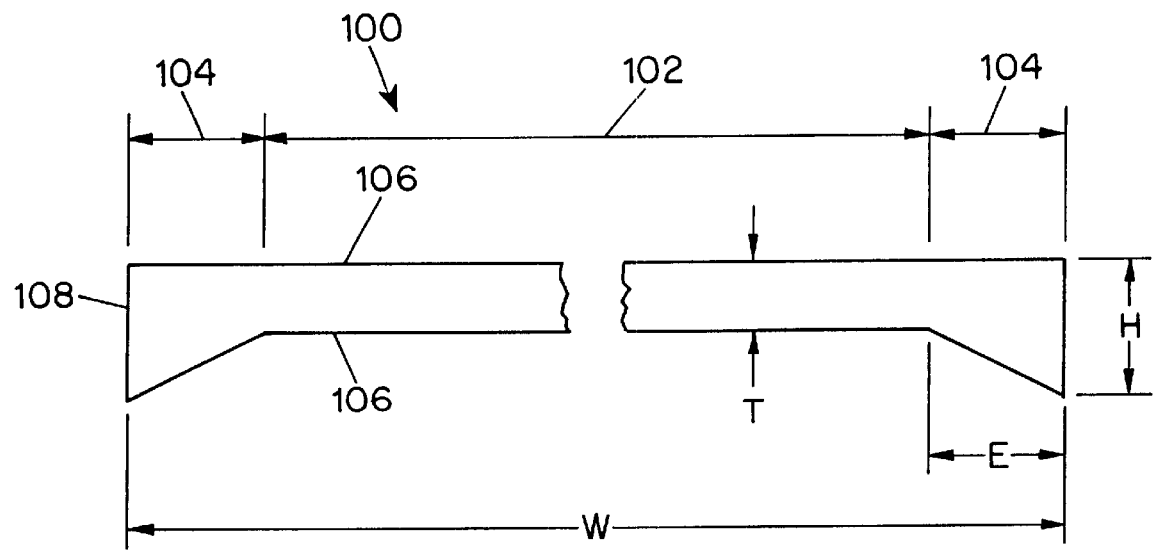
FIG. 9 is a top view of a variable width planar nozzle opening having one-sided linearly diverging end regions.

FIG. 9 is a top view of a planar nozzle opening 100 with a central region 102 and one-sided linearly diverging end regions 104. The planar nozzle opening 100 of FIG. 9 is a variation of the planar nozzle opening 90 of FIG. 8 in that each end region has only one linearly diverging side. As shown in FIG. 9, the planar nozzle opening 100 includes two uniformly spaced opposing nozzle edges 106 which are parallel to each other along the central region 102. At the end regions 104, one of the opposing nozzle edges 106 diverges to form a planar nozzle opening 100 that resembles a rectangle with two right-angled sideways trapezoids attached on either end. The planar nozzle opening 100 with the one-sided linearly diverging end regions 1004 thus ensures nearly uniform mass flow through the planar nozzle opening 100.

Figure 10:
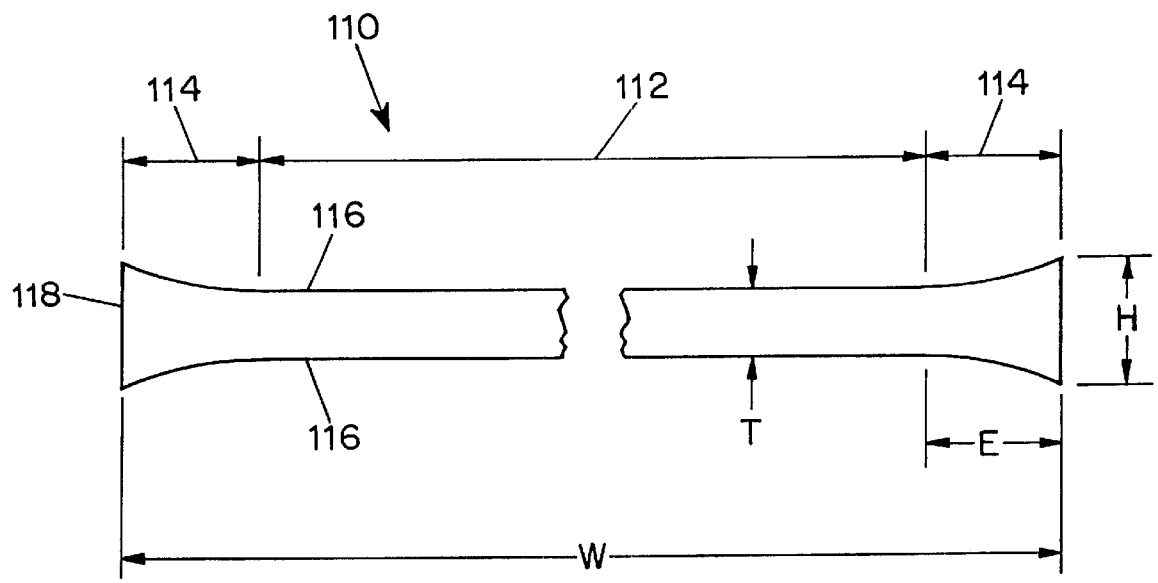
FIG. 10 is a top view of a variable width planar nozzle opening having actuated diverging end regions.

FIG. 10 is a top view of a planar nozzle opening 110 with a central region 112 and actuated diverging end regions 114. As shown in FIG. 10, the planar nozzle opening 110 includes two uniformly spaced opposing nozzle edges 116 which are parallel to each other along the central region 112. At the end regions 114, the opposing nozzle edges 116 diverge in an arcing manner such that the planar nozzle opening 110 resembles a rectangle with two sideways Erlenmeyer flasks attached on either end. The planar nozzle opening 100 with the actuated diverging end regions 114 thus ensures nearly uniform mass flow through the planar nozzle opening 110. In addition, uniform mass flow may be achieved by diverging only one of the nozzle edges instead of diverging both nozzle edges as shown in FIG. 10.

Planar nozzle openings having diverging or non-parallel end regions, as illustrated in FIGS. 7 through 10, have been shown to improve uniform mass flow and thus the uniformity of the planar jet thickness produced by the adjustable planar nozzle. Preferably, the length of the end regions E, i.e., the length of the diverging portions, should be no more than three times the uniform spacing or thickness T of the planar nozzle opening. Also, the maximum thickness, or height H, of the diverging portions should be no more than twice the uniform spacing or thickness T of the planar nozzle opening. The nozzle edge surfaces (not shown) of FIGS. 6 through 10 should be substantially parallel to each other and substantially perpendicular to the uniformly spaced nozzle edges 76, 86, 96, 106 and 116 of FIGS. 6 through 10.

Nominal values for T, as shown in FIGS. 6 through 10, for freeform fabrication applications, can range up to 1 mm. For relatively small-sized objects, a range up to 300 $\mu$m. Nominal values for the width W of the planar nozzle openings can extend up to 500 mm. Again, for a small-sized object, the optimal dimension of W is determined by the characteristic length of the three-dimensional object to be formed, but is typically from 10 mm to 100 mm.

Figure 11:
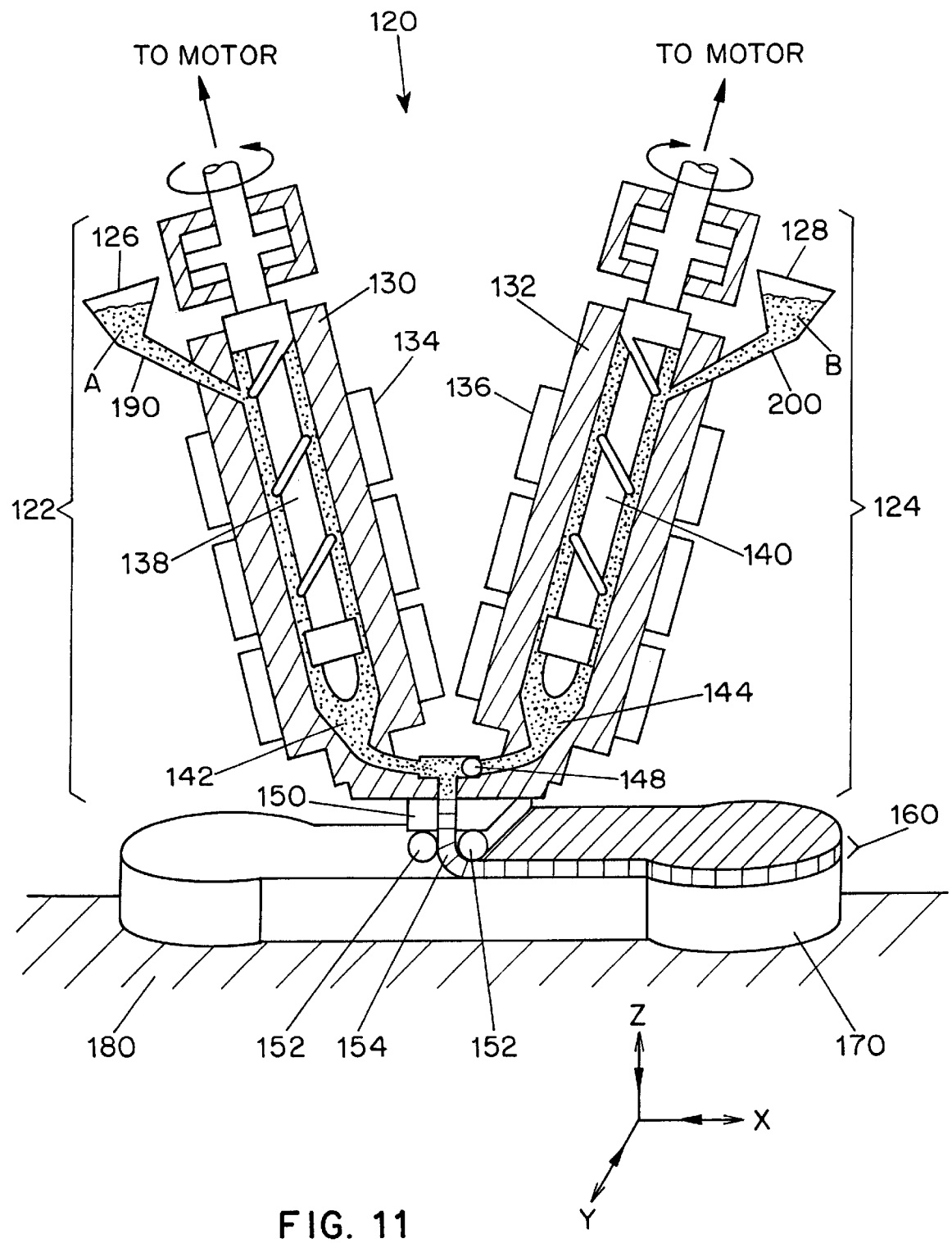
FIG. 11 is a sectional view of another preferred embodiment of an apparatus for forming a three-dimensional object.

FIG. 11 illustrates another preferred embodiment for an apparatus 120 for forming a three-dimensional object. The apparatus 120 is similar to the embodiment of FIG. 1 in that it deposits forming materials onto a position controllable substrate 180 for forming a workpiece 170 but differs in that the forming materials are supplied to a single nozzle. The apparatus 120 includes two cylindrically-shaped extruder containers 122 and 124 for holding building material 190 and supporting material 200, respectively. Although the present embodiment shows two extruder containers, the apparatus may include as many containers and associated components as required by the number of materials being used to form the workpiece 170. The extruder containers 122 and 124 may be housed in an environment-controlled deposition chamber that provides a pressure regulated non-reactive gas, preferably nitrogen or helium, to prevent oxidation of the forming materials.

The apparatus 120 further includes feed hoppers 126 and 128 for providing forming materials, extrusion barrels 130 and 132 for holding the forming materials, heaters 134 and 136 for heating the forming materials, and motor driven rotating screws 138 and 140 for forcing the forming materials through the extrusion barrels 130 and 132. Container orifices 142 and 144 are coupled through a one-way valve 148 to an adjustable planar nozzle 150, which is used as discussed above to deposit variably wide liquid sheets or jets 154 of molten forming materials to form a workpiece 170 onto the substrate 180. Although the adjustable planar nozzle 150 in this embodiment is design to have a nozzle opening having a uniform thickness and a varying width, it may be possible to vary the thickness of the nozzle opening as well.

In the apparatus 120 of FIG. 11, the extruder container 122 is used for depositing a relatively high-melting-temperature building material 190, e.g., metal or ceramic powder slurry, and the extruder container 124 is used for depositing a relatively low-melting-temperature supporting material 200, e.g., wax or a low temperature polymer. For deposition, the building and supporting materials 190 and 200 are fed into the extrusion barrels 130 and 132, respectively, where they are melted by heaters 134 and 136 and pressurized to flow through the adjustable planar nozzle 150 by means of the rotating screws 138 and 140. The adjustable planar nozzle 150 can be designed as shown above in FIGS. 6 through 10. As further shown by FIG. 11, the one-way valve 148 allows only one forming material to flow through the adjustable planar nozzle 150 at any given time.

Both preferred embodiments as shown in FIGS. 1 and 11 are well suited for using a wide variety of forming materials. While the twin-cylinder embodiment of FIG. 1 is better suited for handling metals and alloys, the twin-extruder embodiment of FIG. 11 is better suited for handling polymeric materials such as engineering plastics and preceramic polymers. However, both embodiments are capable of processing many metal and ceramic powders including iron, stainless steel, nickel, tungsten, carbides, alumina, mullite and zirconia. Aqueous and non-aqueous binders can be used with both devices, along with additives such as viscosity modifiers, dispersants, flocculents and lubricants. As such, the embodiments of FIGS. 1 and 11 are especially useful for various kinds of rapid prototyping and fabrications applications.

Another aspect of the embodiments of FIGS. 1 and 11 includes rollers for pressing, cooling and leveling the semi-solidified layers of forming materials deposited on the position controllable substrate. These rollers are shown as a pairs of counter-rotating rollers 34 and 152 in FIGS. 1 and 11, respectively. Although only one pair of rollers is shown, many pairs may be used between the continuous planar jets 44 and 154 of FIGS. 1 and 11, respectively, to cool the forming materials. Preferably, the rollers 34 and 152 are made of high-temperature, high-wear resistant alloys or ceramics. The rollers are motor driven or simply dragged by the contact friction between the rollers and the semi-solidified sheet. Although the major function of the rollers is for leveling, the rollers are also used for pressing and cooling the molten or semi-solidified metal or ceramic sheets. Additional rollers can be added for pressing and cooling purposes. To enhance cooling, the rollers advantageously have drilled passages to allow a coolant to pass through.

Figure 12:
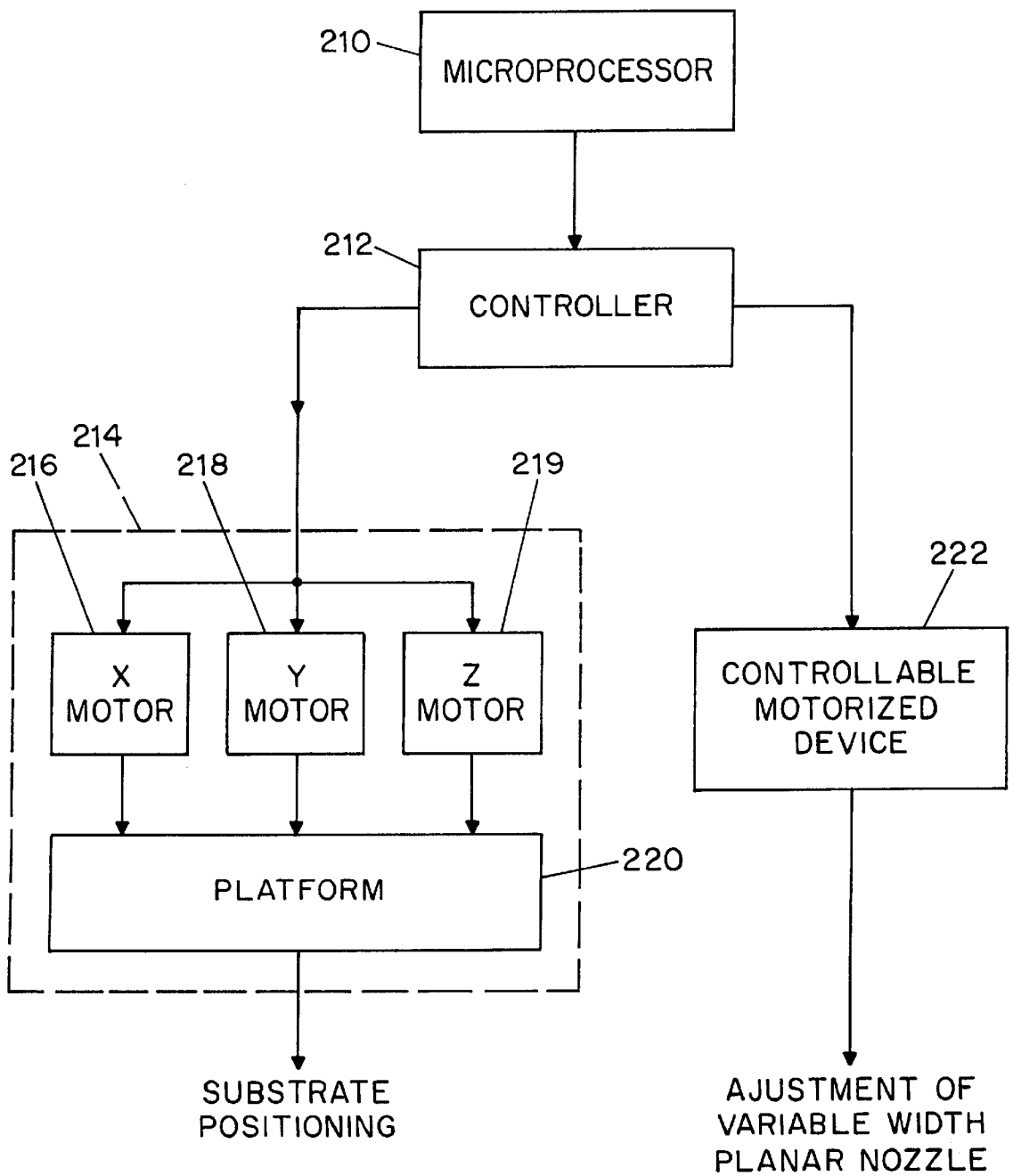
FIG. 12 is a schematic representation of the control system for the embodiments of FIGS. 1 and 11.

FIG. 12 is a schematic representation of the control system for the embodiments of FIGS. 1 and 11. As shown in FIG. 12, the embodiments of FIGS. 1 and 11 include control elements for positioning the substrate and for varying the width of the variable width planar nozzle opening. The control elements include a programmable microprocessor 210, which corresponds to the programmable microprocessor 69b of FIGS. 4b and 4c, for issuing positioning instructions to a position controller 212, which corresponds to the position controller 69a of FIGS. 4b and 4c, for issuing control signals to a controllable motorized device 222 and a position controllable platform 214. The controllable motorized device 222 connected to one or more of the cooperating position controllable plates for varying the width of said variable width planar nozzle opening(s). The position controllable platform 214, which in includes the substrate supporting platform 220 and X, Y and Z coordinate motors 216, 218 and 219 are used to position the substrate beneath the planar jets of forming materials flowing out of the variable width planar nozzle opening(s).

In the embodiments of FIGS. 1 and 11, the position controllable platform 214 is capable of translating in all three Cartesian axes with an accuracy in the order of one micrometer. An RS-232 interface is used to connect the programmable microprocessor 210 with the position controller 212. Preferably, instructions from programmable microprocessor 210 to the position controller 212 are provided in CAD-type formats and generated by a computer program that accepts data representing the three-dimensional object to be formed, and which slices the data into appropriate layers. The position controller 212 then generates the appropriate control signals for the positioning the substrate and for varying the width of the variable width planar nozzle opening.

The completed workpiece is formed by building the layers from the bottom up in sequential order by properly controlling the height of the substrate supporting platform 220. The system is highly flexible in that a multitude of computer programs can be used to design and store data representing the objects to be formed. In addition, designs can be transmitted electronically to the system thus allowing for remote operation and resource networking.

Figure 13:
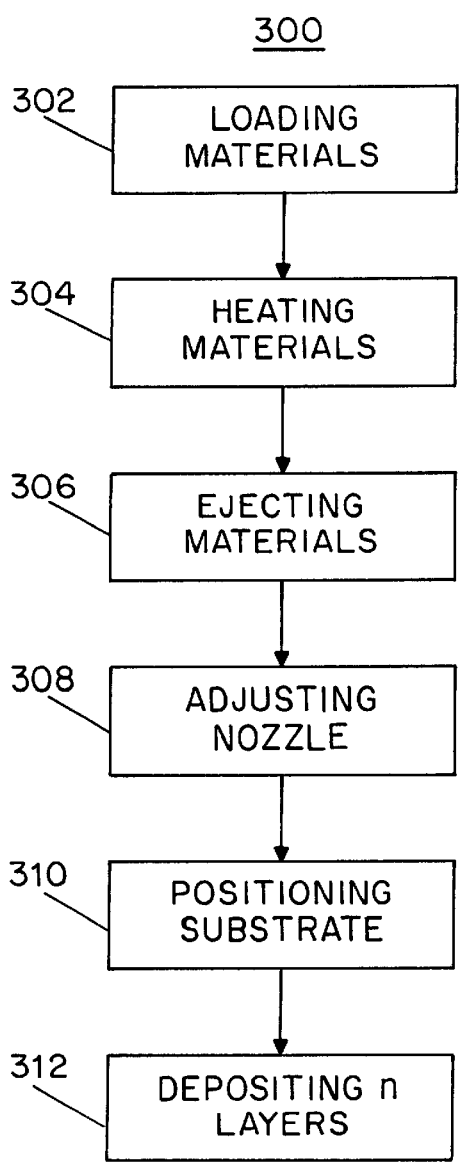
FIG. 13 is a flow diagram of a method for forming a three-dimensional object according to a preferred method of the present invention.

FIG. 13 shows a flow diagram representing a preferred method for forming a three-dimensional object by deposition of molten forming materials, e.g., polymers or metals, on a position controllable substrate. The method includes the steps of loading a reservoir of forming materials in one or more containers (Step 302), heating the forming materials to melt the forming materials in the containers (Step 304), and ejecting the molten forming materials from the containers through one or more adjustable planar nozzles (Step 306). In conjunction with the ejecting step, the method includes the step of adjusting the size, e.g., width, of the adjustable planar nozzles (Step 308), as shown in FIGS. 4a through 4c, to form variable size planar jets of molten forming materials flowing towards the substrate. The planar jets of molten forming materials represent the different layers of the three-dimensional object to be formed. The method further includes positioning the substrate beneath the planar jets (Step 310), and depositing the forming materials in layers on the substrate to form the three-dimensional object (Step 312).

Figure 14:
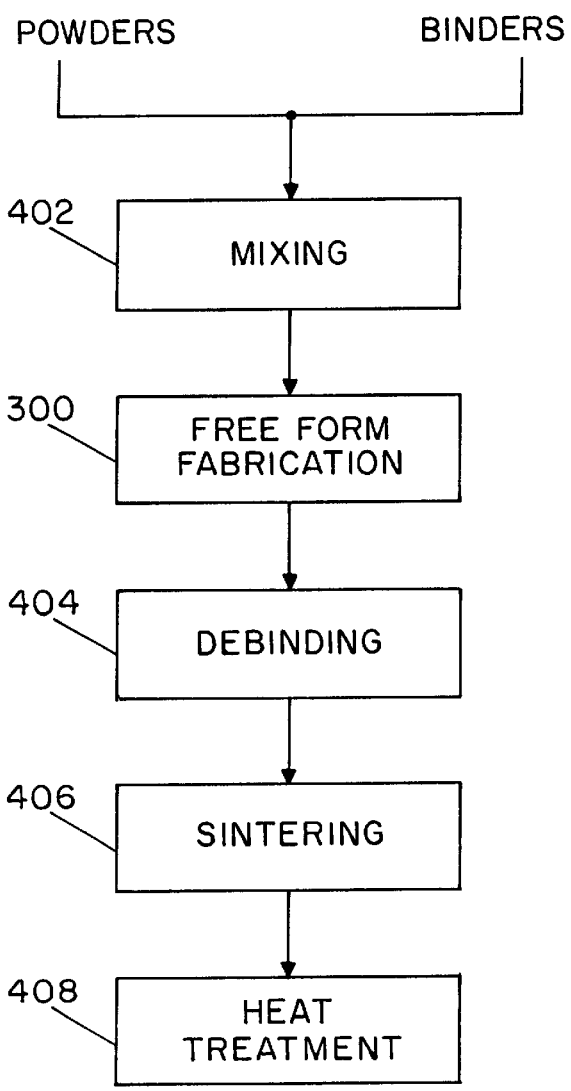
FIG. 14 is a flow diagram of a method for forming a powdered metal and ceramic objects according to a preferred method of the present invention.

FIG. 14 is a flow diagram of a method for forming powdered metal and ceramic objects according to a preferred method of the present invention. The method shown by FIG. 14 includes the method of FIG. 13, and also critical pre- and post-processing steps required for the forming metal or ceramic powder components.

When forming a planar powder sheet or layer, preprocessing of the powder material must be performed in order to make the powder material suitable for flowing through an adjustable planar nozzle. A powder slurry should be formed for this purpose, and can be done by mixing a metal or ceramic powder with a polymeric binder and other additives in a high shear mixer (Step 402). Using either embodiment of FIGS. 1 or 11, the powder/binder mixture is pumped into one of the two containers for use as a building material. Accordingly, a "green preform" consisting of the powder/binder mixture is formed on a position controllable substrate according to the method of FIG. 13. Preferably, the "green preform" has a sufficient "wet" strength so as to resist deformation due to its own weight and handling stresses.

Post-processing of a metal or ceramic powder component includes de-binding to remove the binder (Step 404) and sintering to bond the powders that form the three-dimensional object (Step 406). In addition, post processing may include heat treatment of the sintered three-dimensional object (Step 408). Depending upon the rheological response of the powder/binder mixture, the ejecting pressure is nominally within the range of 5 to 100 psi (35 to 700 kPa) may be required to form the powder/binder plastic objects.

According to another aspect of the present invention, the scanning sequence to be used in forming the three-dimensional object depends upon the geometry of the three-dimensional object to be formed. The three-dimensional object can be characterized as a "simply-connected" or "multiply-connected," depending upon the geometrical shape of the object. The appropriate scanning sequence is then chosen depending upon whether the three-dimensional object is "simply-connected" or "multiply-connected."

Figure 15:
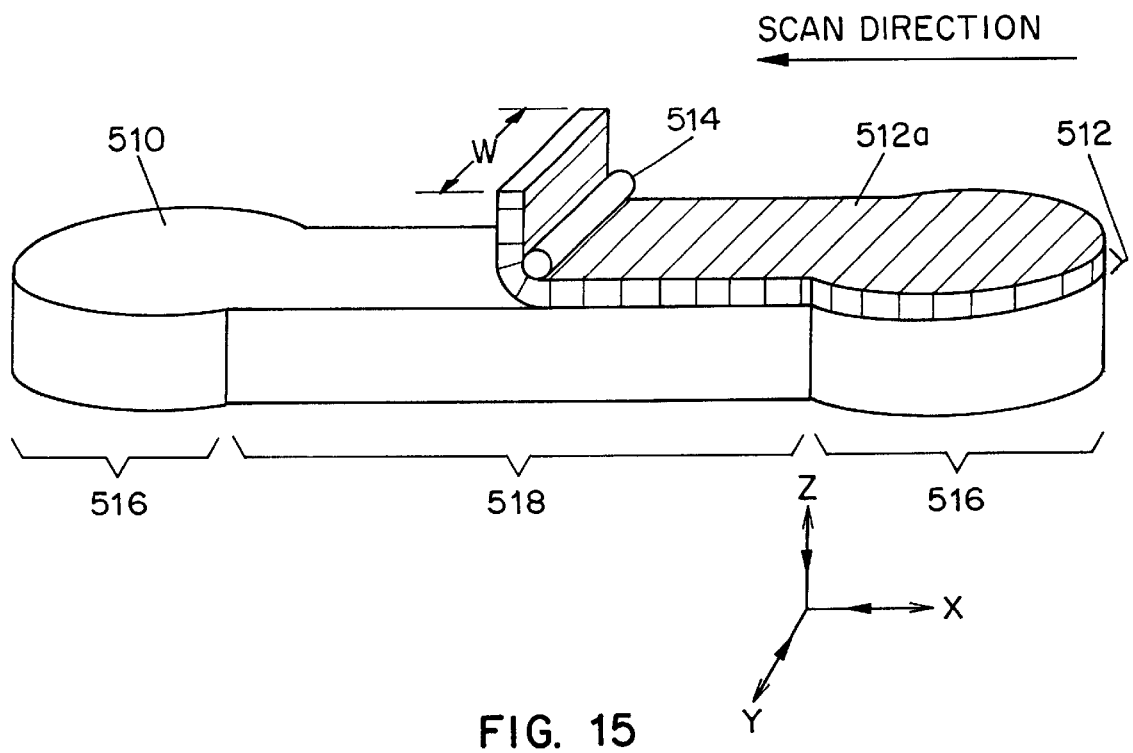
FIG. 15 is a diagrammatic illustration for depositing a "simply-connected" layer of forming material according to a preferred method of the present invention.
Figure 16A:
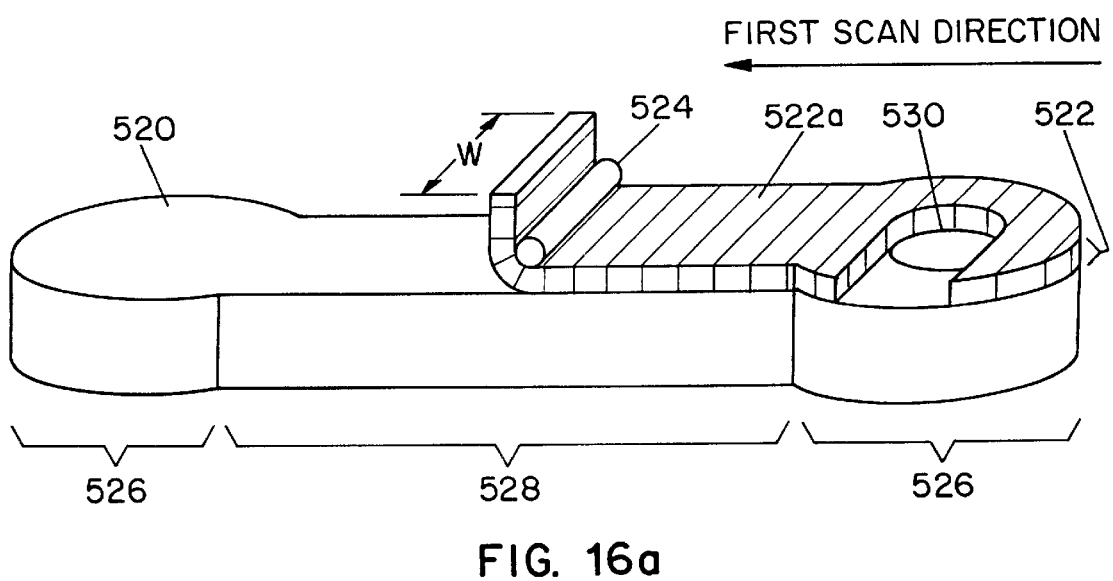
FIGS. 16a and 16b are diagrammatic illustrations showing the formation of a "doubly-connected" layer of forming material according to a preferred method of the present invention.
Figure 16B:
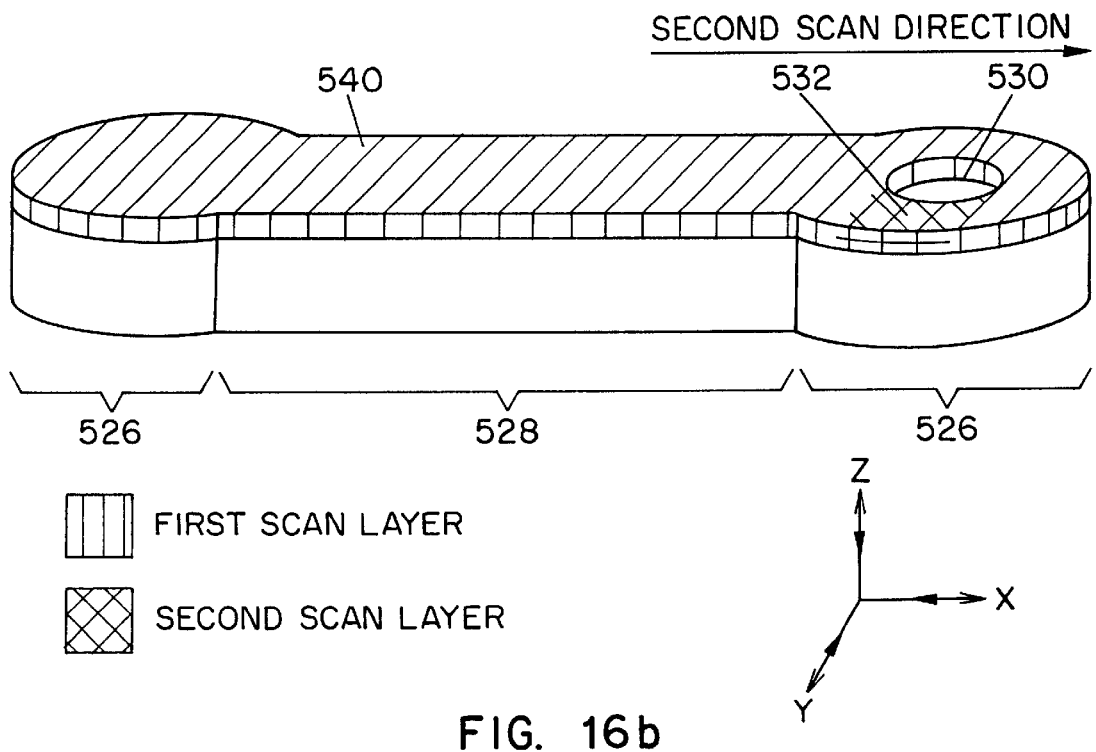
Figure 17A:
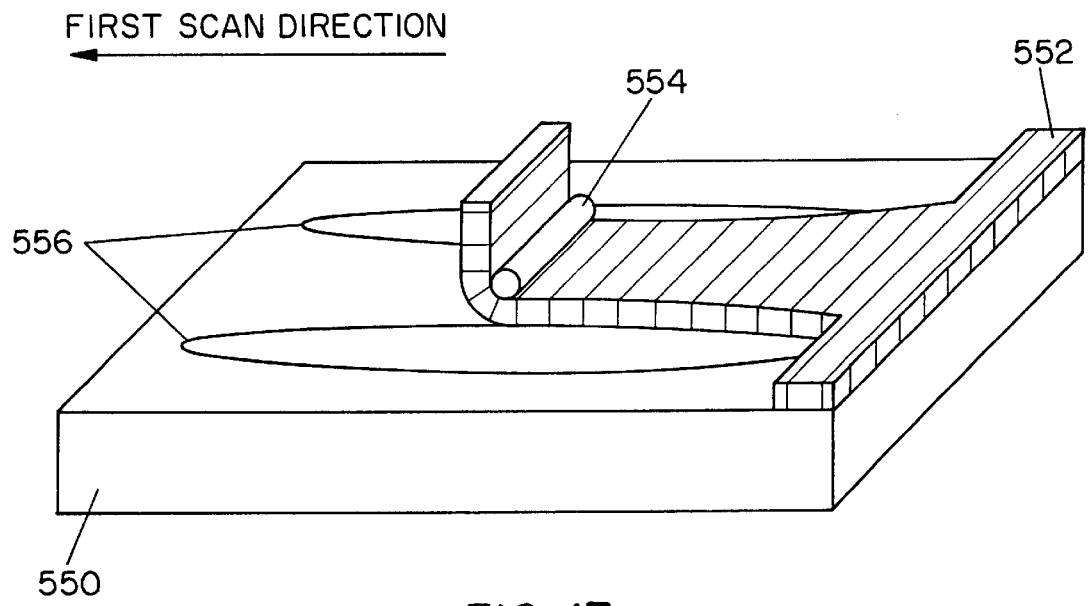
FIGS. 17a through 17c are diagrammatic illustrations showing the formation of a "triply-connected" layer of forming material according to a preferred method of the present invention.
Figure 17B:
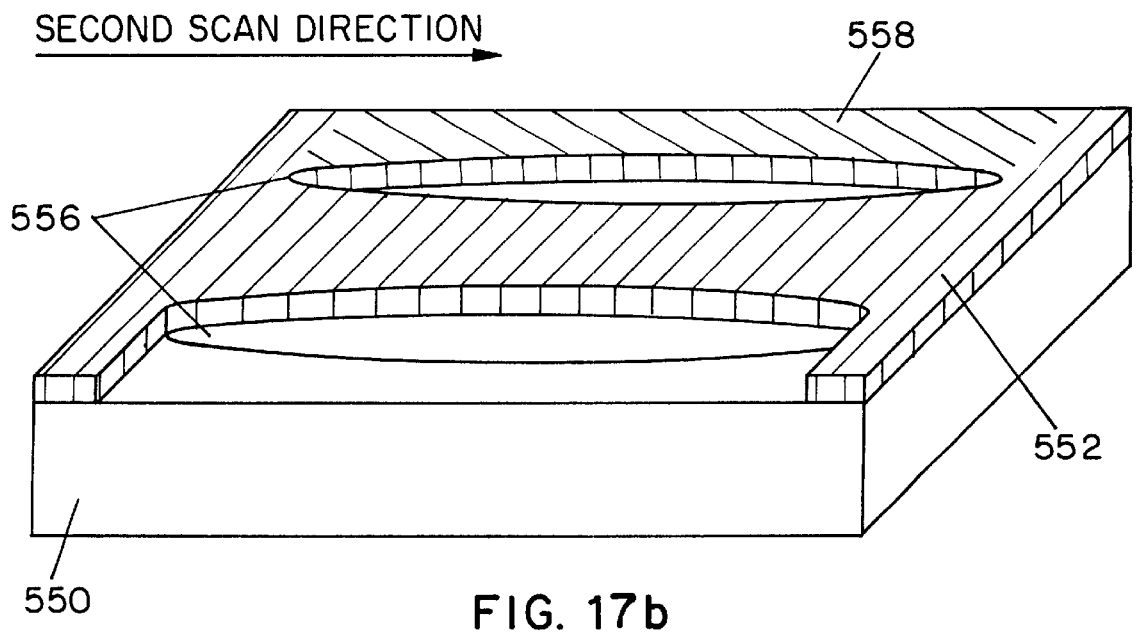
Figure 17C:
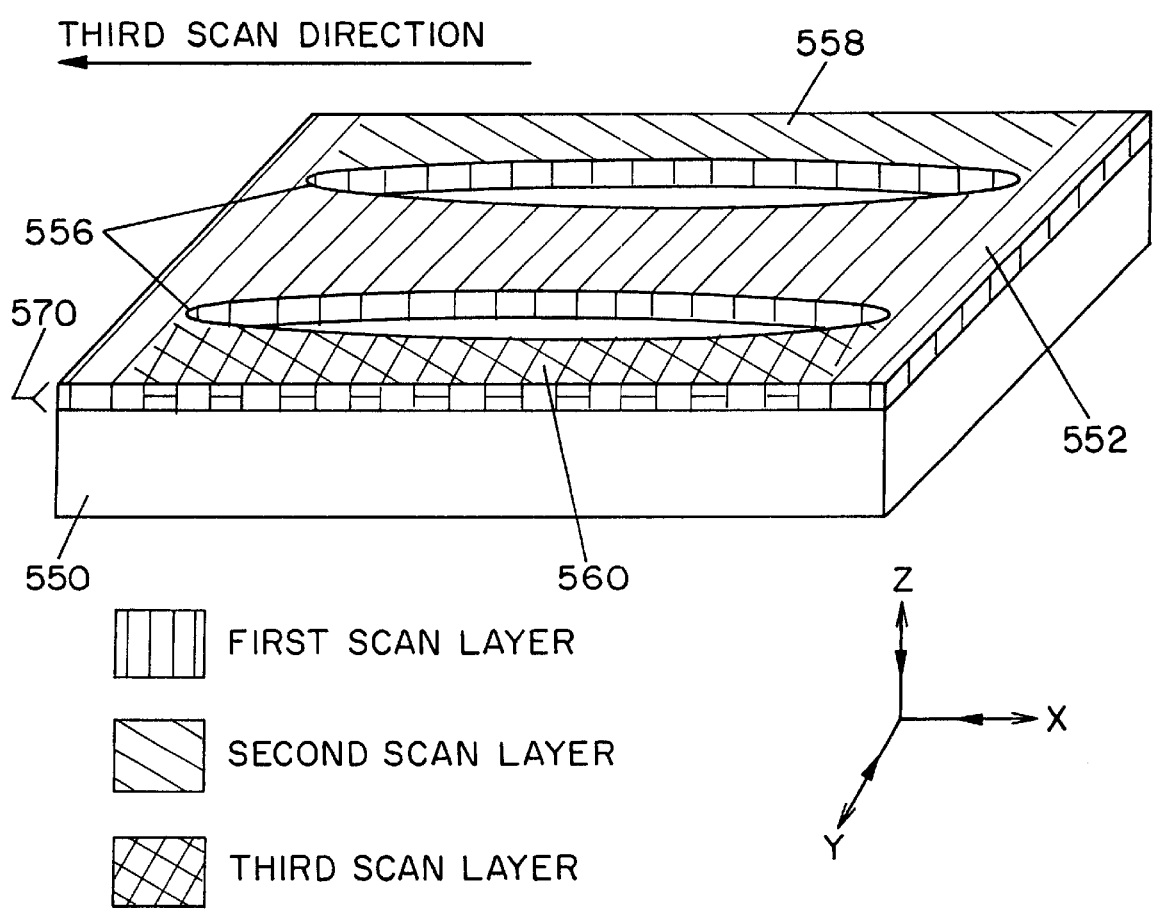

The term "simply-connected" is often used in mathematics to describe a region or space which has no holes, i.e., where all closed curves can be compressed onto a single point. Similarly, the word "multiply-connected" is used to describe a plane with an open set which contains one or more holes. For the purposes of this invention, these and other similar terms, such as "doubly-connected" and "triply-connected," are used to define the geometries of layers sliced from the three-dimensional object to be formed. For example, as shown in FIG. 15, a "simply-connected" layer is a layer which has no holes. A "doubly-connected" layer, as shown in FIGS. 16a and 16b, is a layer having one hole. Similarly, a "triply-connected" layer, as shown in FIGS. 17a through 17c, is a layer having two holes.

As illustrated in FIG. 15, the fabrication of a three-dimensional, "simply-connected" layer 512 is possible in one scan from right to left across the workpiece 510. The workpiece 510 in FIG. 15 is characterized by a narrow central section 518, and wide end sections 516. By using an adjustable planar nozzle to form a variable width planar jet, adjacent columns 512a are deposited in a single scan from right to left across the workpiece to form the entire "simply-connected" layer 512, with the width W of the nozzle opening being suitably varied during the scan.

As previously discussed, the adjustable planar nozzle allows variability of the planar jet width W being deposited. By controlling the adjustable planar nozzle, for example by a computer program, the planar nozzle opening widens to deposit a broadened sheet of material on the end portions of the workpiece 510, and closes to deposit a narrower sheet of material on the central section of the workpiece 510. By contrast, conventional single droplet deposition systems require one pass to create each of the adjacent columns 512a comprising the "simply-connected" layer 512.

FIGS. 16a and 16b illustrate the fabrication of a "doubly-connected" layer 540 consisting of a first scan layer 522 deposited along a first scan direction and a second scan layer 532 deposited along a second scan direction. The first and second scan layers 522 and 532 are deposited on a workpiece 520 having a central section 528, end sections 526 and hole 530 disposed in one end section 526.

As shown in FIGS. 16a and 16b, two scans are required to build a complete doubly-connected" layer 540 of deposited material. During the first scan, as shown in FIG. 16a, a planar jet having a variable width W is deposited from right to left along a first scan direction to form the first scan layer 522. The first scan however leaves an incomplete region near the hole 530. This incomplete region results because the hole 530 interrupts the continuity of the layer to be deposited. As a result, during any given scan, a sheet of material can only be deposited on one side of the hole 530. A second scan as shown in FIG. 16b from left to right along a second scan direction is then required to deposit the second scan layer 532 in the incomplete region resulting from the first scan.

Similarly, FIGS. 17a through 17c illustrate the fabrication of a "triply-connected" layer 570, as shown in FIG. 17c, consisting of a first scan layer 552 deposited along a first scan direction, a second scan layer 553 deposited along a second scan direction, and a third scan layer 560 deposited along a third scan direction. The first, second and third scan layers 552, 558 and 560 are deposited on a workpiece 550 having two elongated, parallel openings 556 disposed therein.

As shown in FIGS. 17a through 17c, the two elongated openings 556 require that two scans be performed to deposit the complete "triply-connected" layer 570 on the workpiece 550. During the first scan, as shown in FIG. 17a, a planar jet having a variable width W is deposited from right to left along a first scan direction to form the first scan layer 552 along the uninterrupted portions of the workpiece 550. The first scan leaves two unfinished strips along opposite sides of the workpiece 550. During the second scan, as shown in FIG. 17b, the planar jet width is adjusted and the forming material is deposited from left to right along a second scan direction to form the second scan layer 558. The second scan layer 558 fills one of the unfinished strips resulting from the first scan. The third scan, as shown in FIG. 17c, then fills the remaining unfinished strip with a third scan layer 560 deposited from right to left along a third scan direction.

In summary, the apparatus and method of the present invention can be used to produce high quality, complex and highly detailed objects much more efficiently than possible with conventional point-to-point fabrication techniques. The apparatus and method of the present invention can also be used to perform fundamental experiments related to deposition forming for explaining how different sheet flow states influence the process yield, porosity and microstructures of deposited materials. With minor modification, the apparatus can be applied to numerous other applications, including rapid solidification research, deposition forming of discrete plastic and metal parts, deposition forming of metal matrix composites, deposition forming of metal coating and deposition sensing of material into a solid object. Moreover, using a multiple-cylinder or multiple-extruder container, the apparatus is used for making metal-matrix or ceramic-matrix composites having excellent reinforcement distribution for high temperature and high strength applications.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

What is claimed is:

1. A method for forming a three-dimensional object by deposition of one or more molten forming materials on a substrate, the method comprising the steps of:

loading a reservoir of said one or more forming materials in one or more containers;

maintaining said one or more forming materials in a molten state in said one or more containers;

ejecting said one or more molten forming materials from said one or more containers and through one or more adjustable planar nozzles;

adjusting the size of said adjustable planar nozzles to form variable size planar jets of said one or more molten forming materials flowing towards said substrate, said planar jets forming layers of said one or more molten forming materials to be deposited on said substrate;

positioning said substrate beneath said planar jets flowing towards said substrate; and depositing said one or more forming materials in layers on said substrate to form said three-dimensional object.

2. The method according to claim 1, wherein said step of adjusting the size of said adjustable planar nozzles comprises the step of varying the width of said planar nozzles.

3. The method according to claim 2, wherein said forming materials includes a supporting material and said method further comprising the step of removing said supporting material after formation of said three-dimensional object.

4. The method according to claim 2, wherein said positioning step comprises the step of deriving a scanning sequence of one or more scans in one or more scan directions, said scanning sequence corresponding to one of said layers of molten forming materials based on the geometrical characteristics of said three-dimensional object.

5. The method according to claim 4, further comprising the step of executing said scanning sequence to deposit said layers of molten forming materials in accordance with said scanning sequence.

6. The method according to claim 5, wherein said step of executing said scanning sequence comprises at least in part the step of scanning in a first of said scan directions such that said molten forming materials are deposited over a region representing a continuous portion of said three-dimensional object.

7. The method according to claim 6, further comprising the step of heating said three-dimensional object.

8. The method according to claim 4, wherein said step of executing said scanning sequence comprises the step of scanning in a first of said scan directions to deposit a simply-connected layer of molten forming material.

9. The method according to claim 4, wherein said step of executing said scanning sequence comprises the step of scanning in at least a first of said scan directions to deposit a doubly-connected layer of molten forming material.

10. The method according to claim 4, wherein said step of executing said scanning sequence comprises the step of scanning in at least a first of said scan directions to deposit a triply-connected layer of molten forming material.

11. The method according to claim 1, further comprising the steps of:

pre-processing said forming materials, said pre-processing step comprising the step of mixing a powder material with a binder material to form a powder/binder building material;

loading said powder/binder building material onto said containers; and post-processing said deposited three-dimensional object, said post-processing step comprising the steps of:
      de-binding said deposited three-dimensional object to remove said binder material from said deposited three-dimensional object;
      sintering said deposited three-dimensional object to solidify and consolidate said deposited three-dimensional object.

* * * * *